US009713023B2

(12) United States Patent
Awada et al.

(10) Patent No.: US 9,713,023 B2
(45) Date of Patent: Jul. 18, 2017

(54) TECHNIQUES FOR MEASUREMENT FILTERING FOR WIRELESS SYSTEMS

(71) Applicant: NOKIA SOLUTIONS AND NETWORKS OY, Espoo (FI)

(72) Inventors: Ahmad Awada, Munich (DE); Anup Talukdar, Glendale Heights, IL (US); Mark Cudak, Rolling Meadows, IL (US); Matthias Hesse, Drebach (DE); Andreas Maeder, Wuerzburg (DE)

(73) Assignee: Nokia Solutions and Networks OY, Espoo (FI)

( * ) Notice: Subject to any disclaimer, the term of this patent is extended or adjusted under 35 U.S.C. 154(b) by 29 days.

(21) Appl. No.: 14/883,185

(22) Filed: Oct. 14, 2015

(65) Prior Publication Data

US 2017/0111810 A1  Apr. 20, 2017

(51) Int. Cl.
*H04W 24/10* (2009.01)
*H04W 24/08* (2009.01)
*H04W 28/02* (2009.01)

(52) U.S. Cl.
CPC ....... *H04W 24/08* (2013.01); *H04W 28/0236* (2013.01); *H04W 28/0289* (2013.01); *H04W 24/10* (2013.01)

(58) Field of Classification Search
CPC ......... H04W 28/0289; H04W 28/0236; H04W 24/08; H04W 24/10
See application file for complete search history.

(56) References Cited

U.S. PATENT DOCUMENTS

| 2010/0190488 | A1* | 7/2010 | Jung | H04W 24/10 455/424 |
| 2014/0177468 | A1 | 6/2014 | Kazmi et al. | |
| 2015/0004979 | A1 | 1/2015 | Szabo et al. | |
| 2015/0237591 | A1* | 8/2015 | Shukair | H04W 56/0045 370/329 |
| 2016/0242069 | A1* | 8/2016 | Li | H04W 24/10 |

FOREIGN PATENT DOCUMENTS

| WO | 2011069550 A1 | 6/2011 |
| WO | 2014/009246 A1 | 1/2014 |
| WO | 2014/009250 A1 | 1/2014 |

OTHER PUBLICATIONS

3GPP TS 36.331 V12.3.0, 3rd Generation Partnership Project; Technical Specification Group Radio Access Network; Evolved Universal Terrestrial Radio Access (E-UTRA); Radio Resource Control (RRC); Protocol specification (Release 12), Sep. 2014, 378 pages.

(Continued)

*Primary Examiner* — Omar Ghowrwal
(74) *Attorney, Agent, or Firm* — Brake Hughes Bellermann LLP

(57) ABSTRACT

An example technique may include measuring a wireless link between a user device and an access point to obtain a first set of measurement values, detecting that the wireless link is temporarily blocked during the measuring, modifying, based on the wireless link being temporarily blocked, the first set of measurement values to obtain a second set of measurement values, and sending, to a network device, a report indicating the second set of measurement values.

23 Claims, 8 Drawing Sheets

(56) References Cited

OTHER PUBLICATIONS

Cudak, Mark et al., "Moving Toward MMwave-Based Beyond-4G (B-4G) Technology", Nokia Siemens Networks, IEEE, 2013, 5 pages.
Talukdar, Anup et al., "Handoff Rates for Millimeterwave 5g Systems", Nokia Solutions and Networks, IEEE, 2014, 5 pages.
Extended European Search Report for European Application 16189179.1, mailed on Mar. 2, 2017, 8 pages.

* cited by examiner

TECHNIQUES FOR MEASUREMENT FILTERING FOR WIRELESS SYSTEMS

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks. mmWave (or extremely high frequency) may, for example, include the frequency range of approximately between 28 and 300 gigahertz (GHz), as an example range. Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, above 6 GHz. For fifth generation wireless systems (5G), an access architecture for deployment of cellular radio equipment employing mmWave radio spectrum has been proposed.

Mobile stations or user devices (e.g., smart phones or other mobile devices or wireless devices) may be served or connected to a serving access point (AP). However, some situations may arise that may cause the user device to lose its connection to the serving AP. In some cases for 5G or mmWave wireless systems, a wireless link between an access point (AP) and a user device (UD) may become blocked.

SUMMARY

According to an example implementation, a method includes: measuring, by a user device, a wireless link between the user device and an access point to obtain a first set of measurement values; detecting that the wireless link is temporarily blocked during the measuring; modifying, by the user device based on the wireless link being temporarily blocked, the first set of measurement values to obtain a second set of measurement values; and sending, by the user device to a network device, a report indicating the second set of measurement values.

According to another example implementation, an apparatus may include at least one processor and at least one memory including computer instructions, when executed by the at least one processor, cause the apparatus to: measure a wireless link between the apparatus and an access point to obtain a first set of measurement values; detect that the wireless link is temporarily blocked during the measuring; modify, based on the wireless link being temporarily blocked, the first set of measurement values to obtain a second set of measurement values; and send, to a network device, a report indicating the second set of measurement values.

According to another example implementation, a computer program product may include a computer-readable storage medium and storing executable code that, when executed by at least one data processing apparatus, is configured to cause the at least one data processing apparatus to perform a method including: measuring a wireless link between the apparatus and an access point to obtain a first set of measurement values; detecting that the wireless link is temporarily blocked during the measuring; modifying, based on the wireless link being temporarily blocked, the first set of measurement values to obtain a second set of measurement values; and sending, to a network device, a report indicating the second set of measurement values.

A computer program product comprising program instructions which, when loaded into an apparatus, execute a method including: measuring a wireless link between the apparatus and an access point to obtain a first set of measurement values; detecting that the wireless link is temporarily blocked during the measuring; modifying, based on the wireless link being temporarily blocked, the first set of measurement values to obtain a second set of measurement values; and sending, to a network device, a report indicating the second set of measurement values.

According to another example implementation, an apparatus may include means for performing a method comprising: measuring a wireless link between the apparatus and an access point to obtain a first set of measurement values; detecting that the wireless link is temporarily blocked during the measuring; modifying, based on the wireless link being temporarily blocked, the first set of measurement values to obtain a second set of measurement values; and sending, to a network device, a report indicating the second set of measurement values.

The details of one or more examples of implementations are set forth in the accompanying drawings and the description below. Other features will be apparent from the description and drawings, and from the claims.

DETAILED DESCRIPTION

Figure 1:
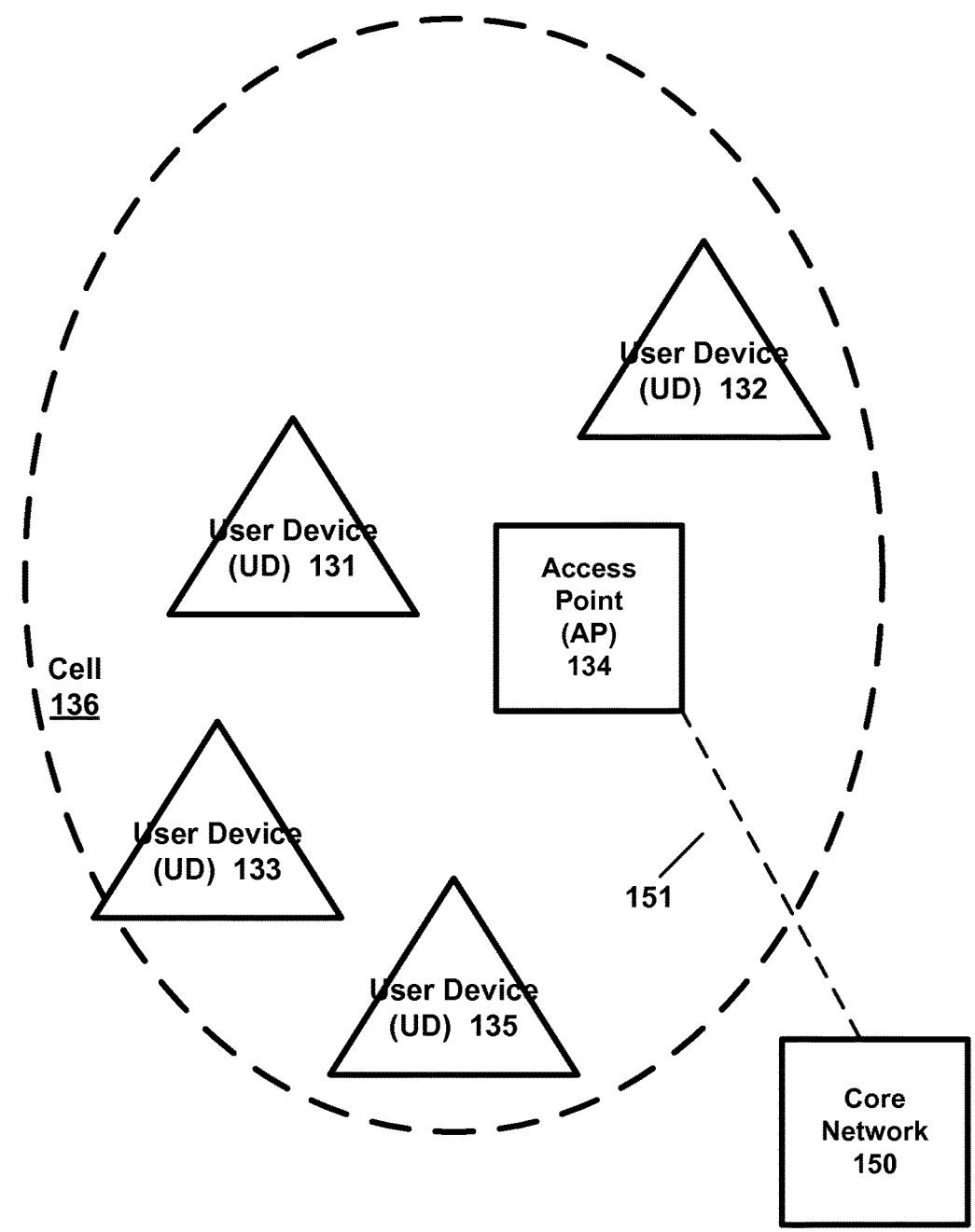
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as user devices (UDs), may be connected (and in communication) with an access point (AP), which may also be referred to as a base station (BS) or an enhanced Node B (eNB). At least part of the functionalities of an access point (AP), base station (BS) or (e)Node B (eNB) may be also be carried out by any node, server or host which may be operably coupled to a transceiver, such as a remote radio head. AP 134 provides wireless coverage within a cell 136, including to user devices 131, 132, 133 and 135. Although only four user devices are shown as being connected or attached to AP 134, any number of user devices may be provided. AP 134 is also connected to a core network 150 via a S1 interface 151. This is merely one simple example of a wireless network, and others may be used. The example wireless network shown in FIG. 1, including the S1 interface 151 and other aspects of FIG. 1, is merely an illustrative example, and the various implementations described herein are not limited thereto.

A user device (user terminal, user equipment (UE)) may refer to a portable computing device that includes wireless mobile communication devices operating with or without a subscriber identification module (SIM), including, but not limited to, the following types of devices: a mobile station, a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, and/or mmWave band networks, or any other wireless network. LTE, 5G and mmWave band networks are provided only as illustrative examples, and the various example implementations may be applied to any wireless technology/wireless network.

Figure 2:
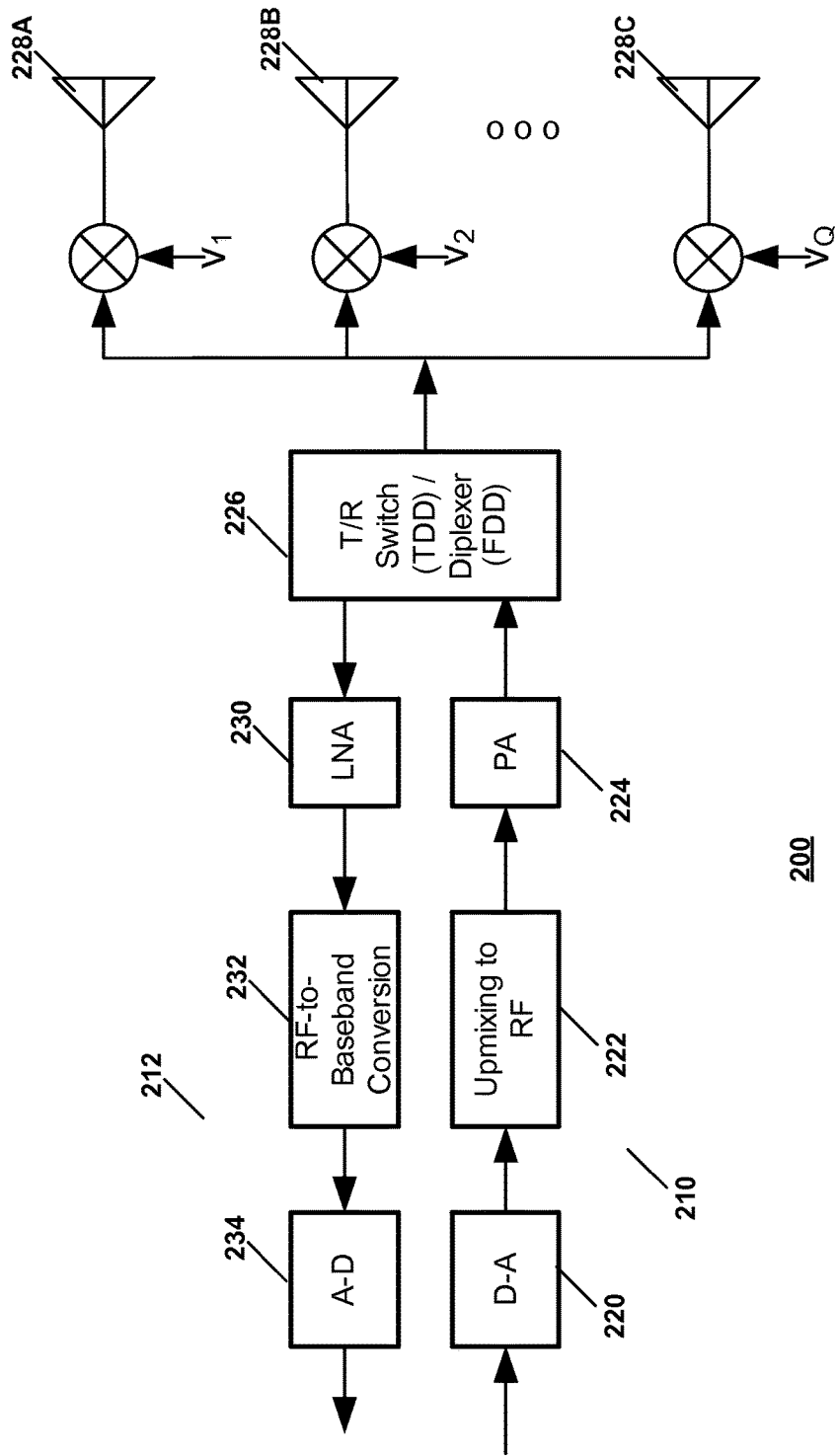
FIG. 2 is a diagram of a wireless transceiver according to an example implementation.

FIG. 2 is a diagram of a wireless transceiver according to an example implementation. Wireless transceiver 200 may be used, for example, at a base station (BS), e.g., Access Point or eNB, or other wireless device. Wireless transceiver 200 may include a transmit path 210 and a receive path 212.

In transmit path 210, a digital-to-analog converter (D-A) 220 may receive a digital signal from one or more applications and convert the digital signal to an analog signal. Upmixing block 222 may up-convert the analog signal to an RF (e.g., radio frequency) signal. Power amplifier (PA) 224 then amplifies the up-converted signal. The amplified signal is then passed through a transmit/receive (T/R) switch (or Diplexer 226 for frequency division duplexing, to change frequencies for transmitting). The signal output from T/R switch 226 is then output to one or more antennas in an array of antennas 228, such as to antenna 228A, 228B and/or 228C. Prior to being transmitted by one or more of the antennas in the array of antennas 228, a set of beam weights $V_1, V_2, \ldots$ or $V_Q$ is mixed with the signal to apply a gain and phase to the signal for transmission. For example, a gain and phase, $V_1, V_2, \ldots$ or $V_Q$, may be applied to the signal output from the T/R switch 226 to scale the signal transmitted by each antenna (e.g., the signal is multiplied by $V_1$ before being transmitted by antenna 1 228A, the signal is multiplied by $V_2$ before being transmitted by antenna 2 228B, and so on), where the phase may be used to steer or point a beam transmitted by the overall antenna array, e.g., for directional beam steering. Thus, the beam weights $V_1, V_2, \ldots$ or $V_Q$ (e.g., each beam weight including a gain and/or phase) may be a set of transmit beamforming beam weights when applied at or during transmission of a signal to transmit the signal on a specific beam, and may be a set of receive beamforming beam weights when applied to receive a signal on a specific beam.

In receive path 212 of wireless transceiver 200, a signal is received via an array of antennas 228, and is input to T/R switch 226, and then to low noise amplifier (LNA) 230 to amplify the received signal. The amplified signal output by LNA 230 is then input to a RF-to-baseband conversion block 232 where the amplified RF signal is down-converted to baseband. An analog-to-digital (A-D) converter 234 then converts the analog baseband signal output by conversion block 232 to a digital signal for processing by one or more upper layers/application layers.

One challenge that may exist for at least some high performance wireless networks (e.g., 5G and/or mmWave band networks) is the propagation characteristics of such 5G or mmWave bands networks, and the increased possibility of dropped connections (or interrupted wireless service) due to interference from objects, fading and other situations.

As an illustrative example, the propagation characteristics in the mmWave band are more challenging than traditional cellular. Diffraction at mmWave bands is effectively non-existent (or at least very low) and propagation behaves similar to visible light. Transmission through most objects is diminished where foliage and other common obstacles can produce severe shadowing. Reflective power, on the other hand, is improved offering new opportunities for completing the link, but may be 15 dB-40 dB weaker (than the main signal path). In a typical urban deployment, 5G or mmWave access points (APs) may, for example, be installed on top of street-side poles, possibly at street corners; other deployment scenarios are stadiums, college campus courtyards, tourist hotspots.

The severe shadowing loss characteristics in the mmWave band suggests (or at least makes it more likely) that, the radio link between a user device (UD) and its serving AP will be blocked or disrupted if the line of sight (LOS) between UD and AP is blocked by obstacles. For a pedestrian walking along the sidewalk in a city block, its LOS may be blocked by fixed obstacles, such as trees, or moving obstacle such as large trucks, or other pedestrians. In a campus courtyard or a tourist hotspot LOS blocking may be caused by crowds. Other types of LOS blocking may be caused by user motions such as hand or body rotations. According to an example implementation, in order to deliver reliable connectivity (or at least improved reliability of the wireless connection/service for the UD) to a user/UD in presence of obstacles, a mmWave access point network may be built with enough redundancies of APs such that in the event of a LOS blocking, the network connection of the UD can be rapidly rerouted via another AP.

According to an example implementation, each UD in a wireless (e.g., 5G or mmWave) network may served by a cluster of APs, which may be referred to as a cluster set of APs for the UD. Members of the cluster set of a UD may, for example, be selected based on the accessibility of the APs from the UD, e.g., based on received signal strength, or Signal-to-Noise and Interference Ratio (SINR) received by UD from each AP, e.g., select the three APs providing the greatest received signal strength as measured by the UD, for example. In example implementations, a UD may have a different cluster set than one or more other UDs, or a first UD may have a cluster set that at least partially overlaps (e.g., shares one or more APs) with the cluster set of a second UD.

According to an example implementation, among the APs in the cluster set, one particular AP can be selected as the serving AP for the UD, through which the network communicates with the UD; the other APs are designated as standby APs (or alternative APs), which may be used in a standby manner, e.g., to be used when necessary, or when a problem or failure occurs with a serving AP (or when a service interruption occurs in the serving AP-UD connection), or for other reason (e.g., to increase throughput or decrease delay of data communications for the UD). For example, a standby AP may be used to reroute the UD's network connection when its radio link to the serving AP is blocked or fails. According to an example implementation, in order to allow communication with both a serving AP and the standby APs of the cluster set, the UD may typically maintain continuous connectivity with each member (AP) of its cluster set of APs by maintaining synchronization with the symbol and frame structure, downlink and uplink control channels, and also maintain beam synchronization by selecting best beams for DL and UL communication with each AP of the cluster set. Although the standby APs (or alternative APs) of a cluster set for a UD are primarily intended to be used to provide robust connectivity to the network in the event of radio link blockages, the standby APs may also be used to improve the network performance, or improve data throughput for the UD. For example, during uplink access procedure (where the UD requests for allocation of uplink radio resources) a UD may send uplink resource requests over the uplink access opportunities (such uplink random access channel or uplink polling channel) of the standby APs (or alternative APs). This method may reduce the uplink access latency and also improves robustness of uplink access in presence of frequent radio link blockages.

Figure 3:
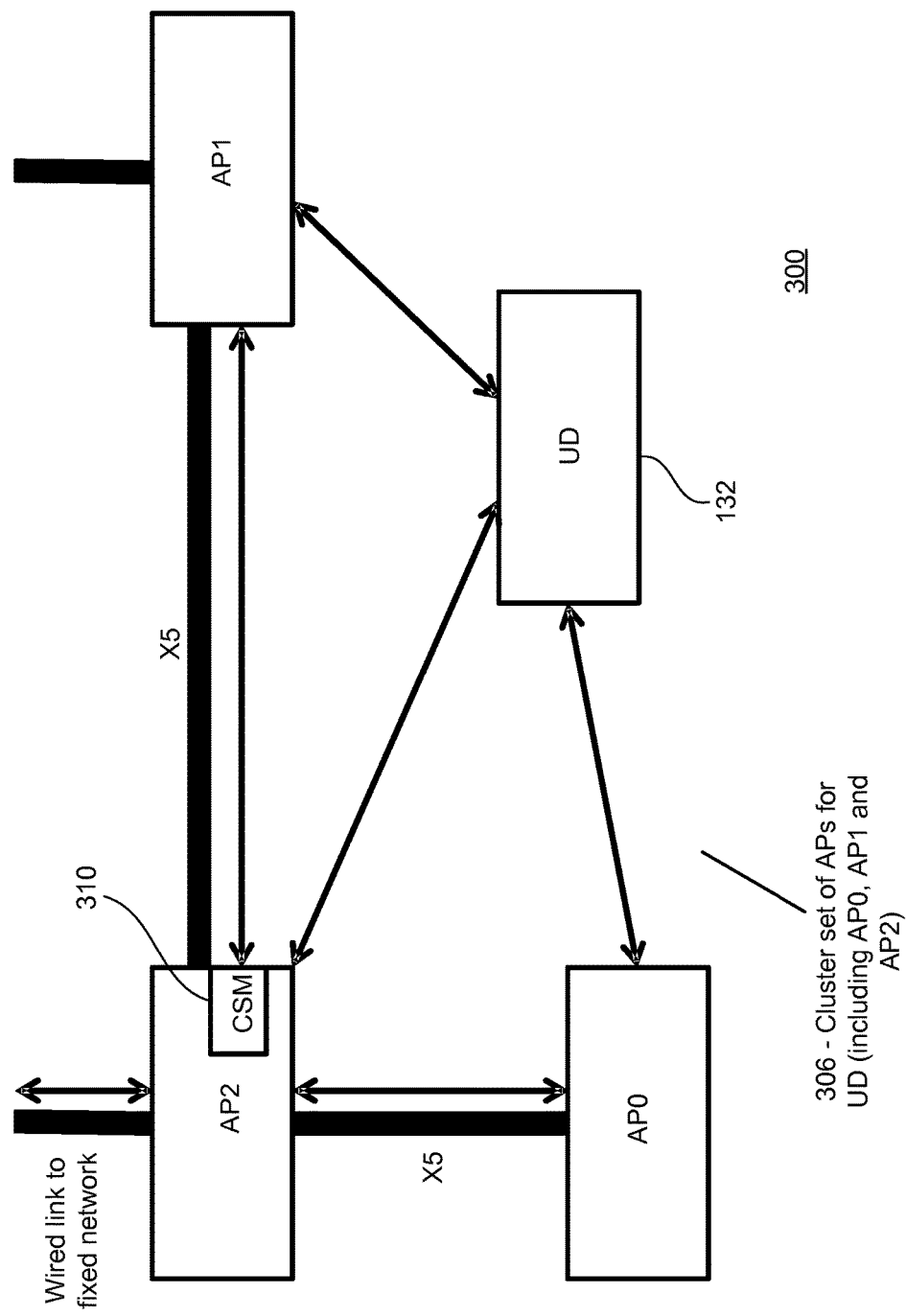
FIG. 3 is a diagram illustrating a wireless network 300 including a cluster set of access points (APs) for a user device (UD) according to an example implementation.

FIG. 3 is a diagram illustrating a wireless network 300 including a cluster set of access points (APs) for a user device (UD) according to an example implementation. In this illustrative example, network 300 may include a user device (UD) 132. Network 300 also includes a cluster set (306) of APs for the UD 132. The cluster set 306 may include a serving AP, AP0, and two standby APs, AP1 and AP2. According to an example implementation, cluster set (306) of APs (including, for example, AP0, AP 1 and AP2 in this example) may be configured and managed by a Cluster Set Manager (CSM) 310. CSM 310 may be provided on an AP, such as AP2 in this example, or other location within the network, e.g., within core network 150. A logical instance of CSM 310 may be provided for each UD. The location of the CSM may for example, be close to the APs in the cluster set to enable low-latency communication with those APs and the UD, e.g., and may be provided or running on a same computer/computing system, or nearby to one of the APs in the cluster set 306, as an example. In this example configuration of wireless network 300 of FIG. 1, AP0 is the serving AP (currently serving the UD 132), whereas AP1 and AP2 are standby APs (alternative APs) for the UD 132. Each of the APs (AP0, AP1 and AP2) of the cluster set 306 may be in communication with the other APs via an interface, e.g., via an X5 (wired) interface. Each AP may also be in communication with the UD 132 via a wireless-interface or air-interface.

According to an example implementation, CSM 310 may configure and manage the APs of cluster set 306, and may also manage aspects of the UD 132. For example, CSM 310 may receive downlink control channel timing information, received signal strength information with respect to multiple APs, and possibly other information, from UD 132. The downlink control channel timing and received signal strength may be measured by the UD (from the perspective of the UD 132). Also, in the event of a service interruption with respect to the serving AP, CSM 310 may operate to relay commands or information from the serving AP to one of the standby APs, for forwarding to the UD 132.

Also, CSM 310 may identify a set of APs to be part of a cluster set 306 (e.g., based on received signal strength, which may include identifying a best set of APs for the cluster set 306). The CSM 310 may receive measurement reports from the UD 132, and may change or update the set of APs to be part of the cluster set 306, e.g., by dropping one or more APs from the cluster set and/or adding one or more APs to the cluster set.

According to one example approach or implementation, to assist the CSM 310 with the decision to add/remove/replace an AP from the cluster set, the UD 132 reports to CSM 310 the measurements of UD-AP wireless links for existing APs in cluster set 306 and possibly one or more newly discovered APs, either periodically or in event-triggered manner. These physical (or physical layer) measurement values for the wireless link(s) may include, e.g., Reference Signal Received Power (RSRP), Reference Signal Received Quality (RSRQ), Received Signal Strength Indicator (RSSI) values, Signal-to-Interference plus Noise Ratio (SINR) values, error rate values, or other type of wireless link measurement values for one or more measurement instants/samples. For example, the measurement report may be sent when a certain condition, called the entering condition of the measurement event, is fulfilled for a certain time interval called Time-to-Trigger. Different measurement events can be configured for adding, removing or replacing an AP from the cluster set. In one illustrative example, the UD 132 may apply L3 (e.g., layer 3) filtering of physical layer (physical) measurements (physical measurement values of a wireless link(s)) before evaluating the reporting criteria of a measurement event. This also applies for periodic measurements. Measurement L3 filtering of physical measurement values may be used to reduce the impact of fast fading and noise and thereby obtain more stable estimates for the signal/wireless link and in turn allow more reliable decisions by CSM 310 in adding/removing/replacing APs to the cluster set. For example, an Infinite Impulse Response (IIR) filter may be used for measurement filtering.

The physical layer measurements of an AP can be obtained by a UD measuring pilot symbols or reference signals received from an AP(s). The physical layer measurement values are separated by measurement time instant/measurement instant.

As noted above, in 5G mmWave system, as an example, the wireless link of an AP can be blocked from time to time due to obstacles. According to an example implementation, the wireless link of the AP may be considered to be blocked if the physical layer measurement is below a certain predefined threshold, which may be denoted Detect_thr. As such, the UD may typically detect and measure sufficient wireless signals/measurement values in time instants when the link is not blocked and very weak signals when the link is blocked. As an illustrative example, for slow moving UDs, the typical blockage duration is in the range of several hundreds of ms (e.g. blocked by passing truck) to several seconds (blocked by a tree). However, for a UD in a fast moving car the blockage duration can be much shorter.

Figure 4:
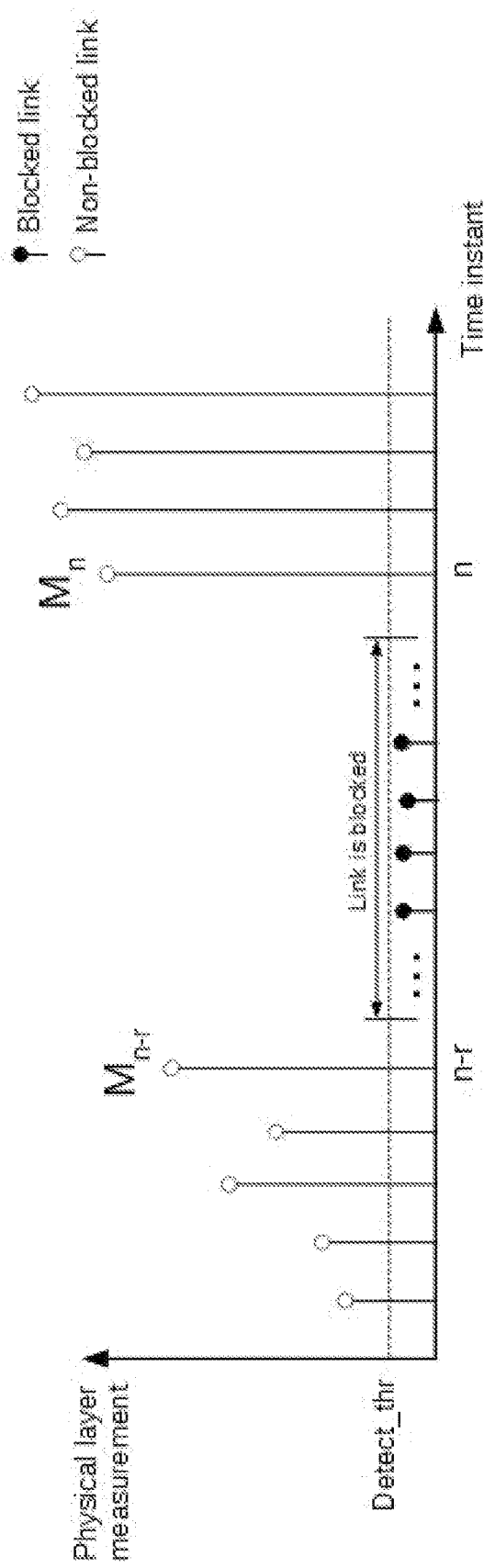
FIG. 4 is a diagram illustrating physical measurement values (M) for a UD-AP wireless link as a function of time according to an example implementation.

FIG. 4 is a diagram illustrating physical measurement values (M) for a UD-AP wireless link as a function of time according to an example implementation. In this illustrative example, physical measurement values M are shown for multiple time instants (measurement instants). However, as shown in FIG. 4, the UD-AP wireless link is temporarily blocked for r–1 values from time instant n–r+1 until time instant n–1. For example, during the period of time in which the wireless link is blocked, the r–1 measurement values are less than the threshold, Detect_thr. However, a problem may arise if filtering the physical measurement values uses or considers all values, i.e., including both physical measurement values when the link is non-blocked (or unblocked) and physical measurement values when the link is blocked. For example, using or performing filtering on measurement values obtained when then link is blocked can lead to a misinterpretation of the filtered measurement results and erroneous actions by CSM 310 in adding/removing/replacing APs from cluster set 306 of UDs. This may be illustrated in the following three example cases.

Example Case 1

In 5G mmWave system, an AP which is already in the cluster set 306 and having a strong link should remain in the cluster set 306 even if its wireless signal (AP-UD wireless link) is blocked for a short period time. This is because there is a fast-rerouting scheme that can re-route the UD's network connection via an alternate AP when its radio link to the serving-AP is blocked as mentioned above. However, filtering the measurements considering all samples/measurement values including those when the link is blocked can make a strong link appear as a weak link to CSM 310 due to very weak signal (physical measurement) values obtained when the link is blocked. Accordingly, if periodic measurements are configured, for example, the CSM 310 receiving these filtered measurements (which would consider the physical measurement values when the link is blocked) would misinterpret a strong link as a weak link and in turn would likely (erroneously) remove the AP in question from the cluster set 306. For example, the CSM 310 may not realize that the link blockage for the AP is temporary, and instead may drop the AP as it may assume the UD has moved to the edge of the cell coverage area for the AP. Similarly, if event triggered measurements are configured, the entering condition of the measurement event for removing an AP would be fulfilled (the filtered measurement would start to drop when the link is blocked) and the UD would send a measurement report to CSM which will remove the AP from the cluster set.

Example Case 2

According to an example implementation, a new detectable AP with a strong link (strong measurement values) should be added to the cluster set 306 by CSM 310 even if the wireless is temporarily blocked for a short time period. However, filtering the measurements considering all measurement values including those when the link is blocked can make a strong link appear to the CSM 310 as weak link. Accordingly, if periodic measurements are configured, the CSM 310 may typically misinterpret the reported measurement results and not add the AP in question to the cluster set. Similarly, if event triggered measurements are configured the entering condition of the measurement event for adding (or replacing) an AP might not be fulfilled at all (e.g., in this example, filtered measurements are weak due to the bias by the measurement values of time instants when the link is blocked) and the CSM 310 would in turn miss the opportunity to add the new detectable AP to the cluster set 306 of UDs.

Example Case 3

An AP with a weak link should be removed from the cluster set 306 irrespective if it is blocked or not. Filtering the measurements including the time instants when the link is blocked makes the weak link to appear even weaker than it is in reality which would lead to an early removal of the AP from the cluster set 306. Thus, in such a case, the AP could have stayed much longer in the cluster set, but may typically be removed early due to the (erroneous) impact of the measurement values obtained when the wireless link is temporarily blocked.

This problem is specific to 5G mmWave and is not present in 3G, LTE or 5G cmWave systems. This is because in 3G/LTE/5G cmWave systems the AP is always detected when the UD is in the coverage of the AP or not detected at all when the UD leaves entirely the coverage of the AP. Thus, the traditional Infinite Impulse Response (IIR) filter or filtering techniques typically applied in 3G or LTE for measurement filtering should not be applied in 5G mmWave wireless system without modifications, as this would result in the erroneous consideration or use of measurement values obtained when the AP-UD wireless link is temporarily blocked.

In LTE, the UD shall start the physical layer measurements when it is configured by the network by a measurement configuration. The IIR filter of the measurements is given by the following equation:

$$F_n = (1-a) \cdot F_{n-1} + a \cdot M_n \qquad \text{Eq. (1)}$$

where $M_n$ is the latest received measurement result from the physical layer;

$F_n$ is the updated filtered measurement result, that is used for evaluation of reporting criteria or for measurement reporting;

$F_{n-1}$ is the old filtered measurement result, where $F_0$ is set to $M_1$ when the first measurement result from the physical layer is received; and $a = 1/2^{(k/4)}$, where k is the filter coefficient. This example equation (including the example value for a) is merely an illustrative example, and other equations and parameters values may be used, e.g., for 5G. It should also be noted that IIR filtering is merely one example and other types of filtering techniques are applicable as well.

According to Eq. (1), if the link of a mmWave AP is blocked in time instant n−1 and non-blocked in time instant n, the output of the filter $F_n$ would be biased (affected) by the previous result $F_{n-1}$. Vice-versa, if the link of the AP is non-blocked in time instant n−1 and blocked in time instant n, the output of the filter $F_n$ would be biased by the physical layer measurement $M_n$. This biasing by the measurement values when the link is blocked would lead to misinterpretation of the measurement results and typically an incorrect decision/actions by the network/CSM as described in the aforementioned three example cases. Thus, for example, Eq. 1 does not distinguish between the time instants when the link is blocked and non-blocked, and thus, the CSM 310 may make erroneous (or incorrect) decisions, e.g., in terms of adding or removing APs from cluster set 306, based on the usage or filtering based on measurement values obtained when the wireless link is blocked.

Therefore, according to an example implementation, techniques are provided that distinguish between time instants when the link is blocked and not blocked. According to an example implementation, techniques are provided to derive from physical layer measurements of the UD (AP-UD link measurements) new filtered measurements that are not biased/impacted by the measurement values when the link is blocked, or at least impacted less by measurement values when the wireless link is blocked. Several different techniques are described.

In a first group of filtering methods/techniques, the UD estimates the filtered measurements of time instants when the link is blocked by interpolating/extrapolating the measurement values of time instants when the link is not blocked. In this manner, according to these example techniques, physical (and filtered) measurement values for time instants when the wireless link is blocked are ignored or discarded, and are replaced with estimated (physical or filtered) measurement values by interpolating or extrapolating measurement values when the link is not blocked.

In a second group of filtering methods, filtered measurement values are provided only in time instants when the link is not blocked. In a first method of this group, the UD stops the filter each time the link is blocked and restarts it when the link is detected again. In another softer method, the UD suspends the filter each time the link is blocked; and resumes it when the link is non-blocked again by updating for one time the filter factor a of Eq. (1) to take into account the old filtered measurement result corresponding to the last time instant before the blockage (last non-blocked measurement value). In a next time instant, the UD applies the configured filter factor a of Eq. (1) again.

Also, according to another example implementation, one filtering technique may be selected of the plurality of filtering techniques/methods, depending on the duration of the link blockage. For example, the best method to use for filtering the measurements might depend on the duration of the link blockage. For instance, the aforementioned method relying on interpolation/extrapolation (from the first group) may perform best when link blockage is relatively short and the correlation between the measurement values can be well exploited, whereas the first method from the second group performs best when the link blockage duration is long enough that the history (previous non-blocked measurement values) can be completely ignored. According to an example implementation, the network (CSM or any other network entity) may configure the UD to apply different filtering methods depending on the duration of the link blockage.

One or more example implementations may include one or more of the following features:

1) When performing L3 (layer 3) filtering, the UD may derive from physical layer measurement values new filtered measurement values that are not biased or impacted by the measurement values when the link is blocked.

2) CSM 310 may be able to assess the signal strength/quality of AP-UD wireless (radio) link irrespective of its blockage and make the correct decisions when adding/removing/replacing an AP from the cluster set 306.

3) The UD may be configured by the network to adapt (or change) dynamically the L3 filtering method depending on the duration of the link blockage. This may allow the UD to apply a first filtering technique if the link blockage is less (in duration) than or equal to a threshold time, and may apply a second filtering technique if the wireless link blockage is greater than the threshold time.

First Group of Filtering Methods

According to an example implementation, in this first group of methods, the UD may estimate the filtered measurements (filtered measurement values) of time instants when the link is blocked using the measurement values of time instants when the link is not blocked.

A. Interpolation Method

If the link is blocked for r−1 time instants (measurement instants) from time instant n−r to time instant n, the UD obtains estimated filtered measurement values $F_i$ where i=n−r+1, . . . , n−1 by interpolation using either 1) the physical layer measurements $M_x$ or 2) the filtered measurements $F_x$ of time instants occurring before the link blockage at time step n−r, i.e., x≤n−r, and after the link blockage at time step n, i.e., x≥n. One implementation of option 1) is that the UD obtains first $M_i$ where i=n−r+1, n−1 by interpolation and then finds $F_i$ by applying the traditional IIR filter as explained in Eq. (1).

B. Extrapolation Method

In this example method, UD obtains estimated filtered measurement values $F_i$ where i=n−r+1, . . . , n−1 by extrapolation using either 1) the physical layer measurements $M_x$ or 2) the filtered measurement values $F_x$ of time instants occurring before the link blockage at time step n−r, i.e., x≤n−r, or after the link blockage at time step n, i.e., x≥n. One implementation of option 1) is that the UD obtains first $M_i$ physical measurement values, where i=n−r+1, . . . , n−1 by extrapolation and then finds the filtered measurement value $F_i$ by applying the traditional IIR filter as described in Eq. (1).

Figure 5:
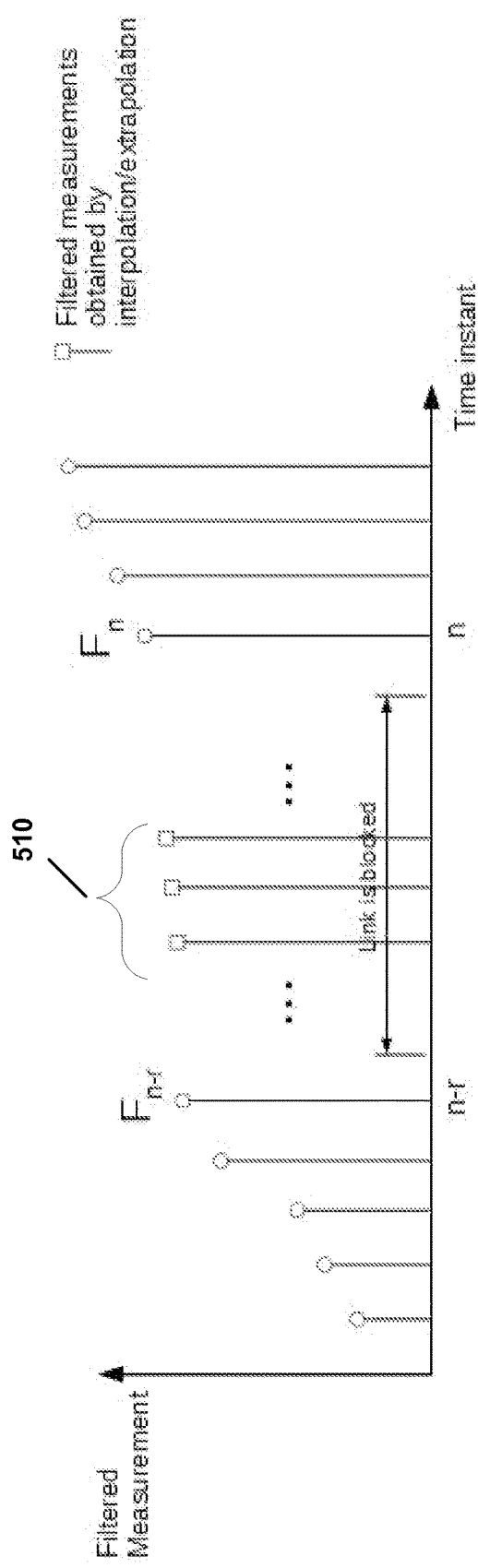
FIG. 5 is a diagram illustrating filtered measurement values for a UD-AP wireless link as a function of time, including estimated filtered measurement values 510 for time instants when the link is blocked, according to an example implementation.

FIG. 5 is a diagram illustrating filtered measurement values for a UD-AP wireless link as a function of time, including estimated filtered measurement values 510 for time instants when the link is blocked, according to an example implementation. In FIG. 5, the filtered measurement values $F_n$ are shown, including estimated filtered measurement values $F_n$ for time instants when the link is blocked between n−r and n time instants. These estimated filtered measurement values $F_n$ (510) for time instants when the link is blocked may be estimated by interpolation or extrapolation, or other estimation technique, according to an example implementation, using physical measurement values or filtered measurement values for time instants when the link is not blocked.

According to an example implementation, the accuracy of the first group of filtering methods (estimating filtered measurement values based on interpolation/extrapolation) would depend on the accuracy of the interpolation/extrapolation which may, for example, consider the variations of the channel due to large and small scale fading assuming that the blockage did not occur. This method performs best when the duration of the blockage is relatively short and the correlation between the measurement values can be exploited.

Second Group of Filtering Methods

In this second group, the UD may obtain the filtered measurement values only in time instants (measurement instants) when the link is not blocked, i.e., no filtered measurements are computed when the link is blocked, according to an illustrative example implementation.

A. Method 1

For method 1 of the second group of example filtering methods, the UD may stop (or cease operating) the filter when the link is blocked and restarts the filter when the link becomes unblocked. Thus, in this example method, filtering is performed only on non-blocked measurement values (for time instants when the link is not blocked). According to an example implementation, link blockage may be detected when physical measurement values are less than the threshold Detect_thr, and a link may be detected as not blocked when a physical measurement value is greater than this threshold.

Figure 6:
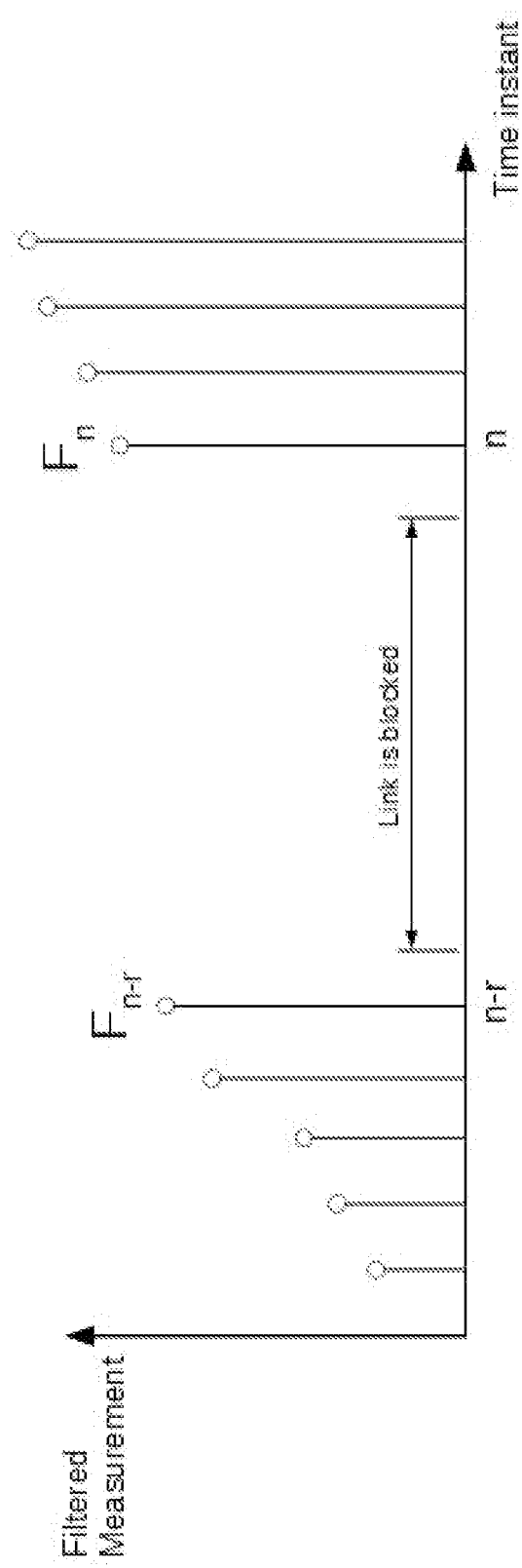
FIG. 6 is a diagram illustrating filtered measurement values for a UD-AP wireless link as a function of time according to another example implementation.

For example, consider the case when the link is blocked between time instants n–r and n, as shown in FIG. 6. FIG. 6 is a diagram illustrating filtered measurement values for a UD-AP wireless link as a function of time according to another example implementation. At time instant n, the updated filtered measurement value $F_n$ would be set to the first measurement result received from the physical layer after the link blockage, i.e., $$F_n = M_n \qquad \text{Eq. (2)}$$

where n is the first time instant occurring after the link blockage. This filtering method performs best when the duration of the blockage is long enough such that the history can be completely ignored.

B. Method 2

Within the second group of filtering methods, an example second method is a softer version of the first method. For illustration, FIG. 6 shows filtered measurement values $F_n$ and $F_{n-r}$ separated by r–1 time instants for which the link is blocked. According to an example implementation, filtered measurement value $F_n$ may be expressed as a function of $F_{n-r}$ as follows:

$$F_n = (1-a') \cdot F_{n-r} + a' \cdot M_n \qquad \text{Eq. (3)}$$

Where, in an illustrative example implementation, $a' = 1 - (1-a)^r$. This is merely an example implementation to calculate a'. In an example implementation of a', in general, the longer the time from the last time instant when the link was not blocked until the current time instant, the lower the first weight (1–a') applied to the last filtered measurement result $F_{n-r}$ is, according to an example implementation.

Thus, according to an example implementation of this second method, the updated filtered measurement value $F_n$ may be expressed as a weighted function of the last filtered measurement result $F_{n-r}$ where n–r is the last time instant when the link was not blocked, and a current physical measurement value $M_n$. In Eq. (3), a first weight (1–a') is applied to the last filtered measurement result $F_{n-r}$ where n–r is the last time instant when the link was not blocked, and a second weight (a') is applied as a weight to the current physical measurement value $M_n$. Thus, the longer the time from the last time instant when the link was not blocked until the current time instant, the lower the first weight (1–a') applied to the last filtered measurement result $F_{n-r}$ is. This has the effect of decreasing the impact/influence of past (unblocked link) filtered measurement values on a current filtered measurement value $F_n$, if the last unblocked filtered measurement value was too long ago.

In time instant n+1, the UD will revert back to the original filter factor a, i.e., $$F_{n+1} = (1-a) \cdot F_n + a \cdot M_{n+1} \qquad \text{Eq. (4)}$$

In Eq. (3), if r goes to infinity (e.g., meaning the last or most recent unblocked filtered measurement value occurred very long ago, and thus, can/should be ignored), a' would be equal to 1 and $F_n = M_n$ which is the same as Eq. (2) in method 2. According to an example implementation, this method (e.g., method 2 of the second group, which may use Eq. (3), for example) may be suitable for both short and long blockage durations.

According to an example implementation, some filtering methods may perform better than others for some specific block durations. As an example, at least in some cases, the first group of filtering methods may work better for relatively short link block duration, whereas method 1 from the second group of filtering methods may work better for longer link block durations. Thus, according to an example implementation, a UD may be configured by the network or CSM to use/apply different filtering methods depending on the duration of the link blockage. For this, the network may configure the UD with a threshold $T_{block}$ and the filtering method to apply may then depend on whether the duration of the link blockage is smaller than (or equal to), or greater than, $T_{block}$. The configuration could be sent using either a system information block or dedicated Radio Resource Control (RRC) signalling from AP/CSM to the UD. For instance, if the duration of the blockage is smaller than $T_{block}$, the UD is configured to apply a method from the first group which is based on interpolation/extrapolation, otherwise the UD is configured to apply the first method from the second group which ignores completely the history of previous filtered measurement values. This is merely one illustrative example of how different filtering methods/techniques may be used, e.g., depending on the duration of the link blockage.

Figure 7:
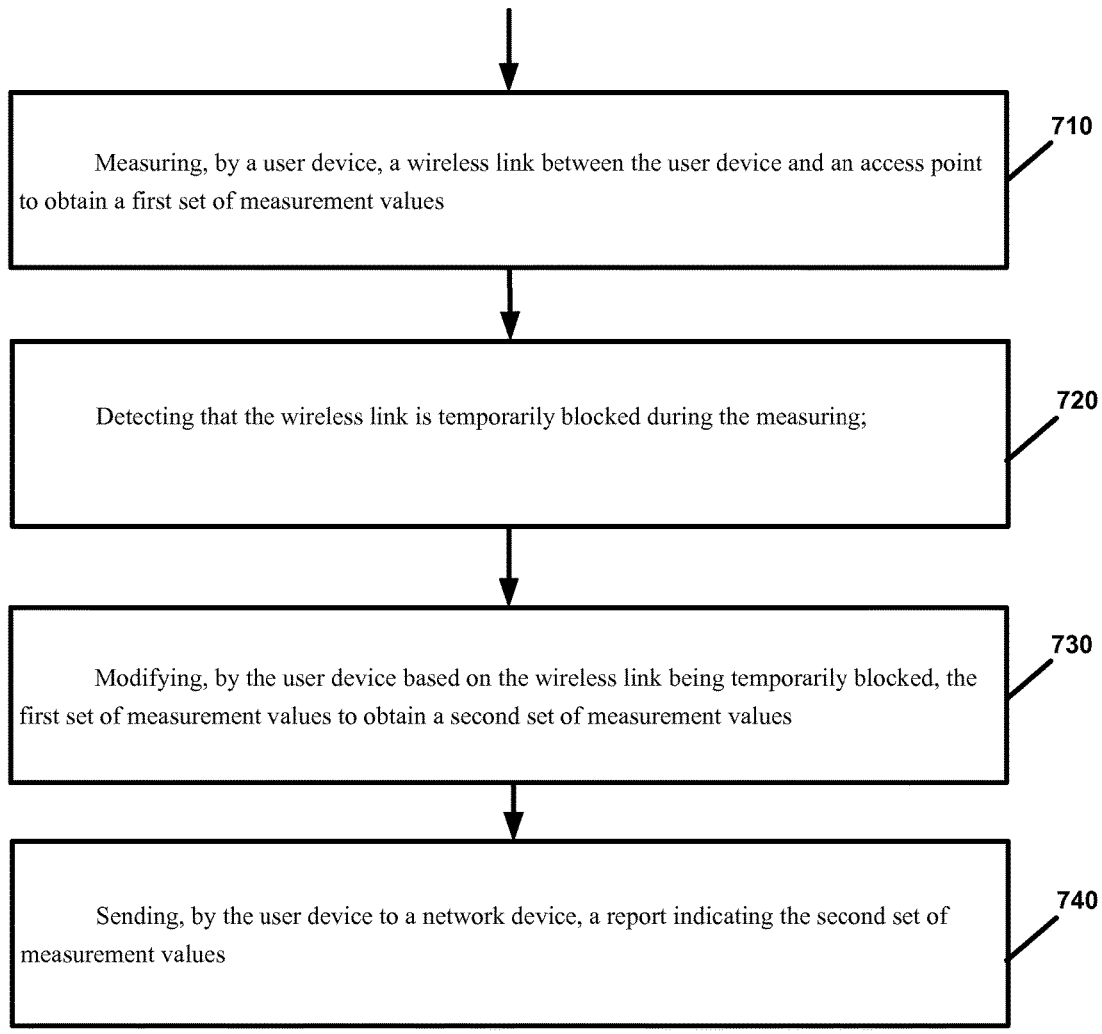
FIG. 7 is a flow chart illustrating operation of a user device according to an example implementation.

FIG. 7 is a flow chart illustrating operation of a user device according to an example implementation. Operation 710 includes measuring, by a user device, a wireless link between the user device and an access point to obtain a first set of measurement values. The first set of measurement values may be, for example, physical (physical layer) measurement values or filtered measurement values.

Operation 720 includes detecting that the wireless link is temporarily blocked during the measuring. According to an example implementation, the UD may detect when a wireless link is blocked by detecting one or more physical measurement values that are less that a threshold (e.g., Detect_thr). The threshold Detect_thr may be preconfigured to the UD or the network (e.g. CSM 310) may indicate the value to the UD.

Operation 730 includes modifying, by the user device based on the wireless link being temporarily blocked, the first set of measurement values to obtain a second set of measurement values. Modifying the first set of measurement values may include performing a variety of processing or modifying of the first set of measurement values, such as, for example: filtering the first set of measurement values to obtain the second set of measurement values; discarding or dropping one or more measurement values when the link is blocked; estimating one or more measurement values when the link is blocked based on measurement values when the link is not blocked (e.g., via interpolation/extrapolation); stopping filter/ceasing filtering of the first set of measurement values when the link is blocked, and other processing or modifying of the first set of measurement values. And, operation 740 includes sending, by the user device to a network device, a report indicating the second set of measurement values.

The second set of measurement values, may be either filtered or non-filtered values. Thus, the process of FIG. 7 may be based on filtered samples or physical layer samples. When periodic measurements are configured, the UD could in principle send either 1) physical layer measurements and the network performs the filtering or 2) just the filtered measurements. In option 1 is that the UD may need to send a high number of physical measurement samples in order for the network to derive the filtered measurement since the network needs to perform the filtering, such as IIR filtering. So option 1 may involve higher signaling overhead although it is less complex to UD (since it need not perform the filtering). When event-triggered reporting is performed, the UD may filter the measurements, since the filtered measurements are used to check the entering condition of the measurement event. In this technique, since the filtered measurements are already available at the UD, the UD may directly send them to the network.

According to an example implementation of the method of FIG. 7, the measurement values of the first set of measurement values may include at least one of the following: physical measurement values; and filtered measurement values wherein one or more physical measurement values have been filtered to obtain one or more filtered measurement values; and wherein the measurement values of the second set of measurement values include at least one of the following: physical measurement values; and filtered measurement values.

According to an example implementation of the method of FIG. 7, the modifying may include: determining, by the user device, at least one measurement value, of the second set of measurement values, for a measurement period when the wireless link between the user device and the access point is blocked, the determining being based on at least one measurement value of the wireless link when the wireless link is not blocked.

According to an example implementation of the method of FIG. 7, the determining the at least one measurement value for the measurement period when the wireless link is blocked may include: estimating the at least one measurement value when the wireless link is blocked based on interpolation or extrapolation using at least one measurement value when the wireless link is not blocked.

For interpolation, the UD may utilize several options. In option 1, the UD makes use of the physical layer measurements before and after the link blockage. In option 2, the UD applies the filtered measurements before the link blockage and physical layer after link blockage. In option 3, the UD uses the filtered and physical measurements before the link blockage and physical layer after link blockage. Interpolation may not be performed using the filtered measurements before and after the blockage if IIR filter of Eq. (1) is used since the filtered measurements after the blockage cannot be computed without knowing the filtered measurements during the link blockage. However, the filtered measurements after link blockage can be used in interpolation if they are computed according to Eq. (2) and Eq. (3) or any other filtering method involving only the physical layer/filtered measurements when the wireless link is not blocked.

According to an example implementation of the method of FIG. 7, the modifying may include: removing, from the first set of measurement values, one or more measurement values that are measured for measurement periods when the wireless link is blocked.

According to an example implementation of the method of FIG. 7, the method may further include filtering the second set of measurement values to obtain a set of filtered measurement values.

According to an example implementation of the method of FIG. 7, the filtering is based on a plurality of measurement values that are available or interpolated/extrapolated when the wireless link is not blocked and blocked, respectively.

According to an example implementation of the method of FIG. 7, the filtering may include: performing filtering on physical measurement values when the wireless link is not blocked; and ceasing the filtering on physical measurement values during any time periods in which the wireless link is blocked.

According to an example implementation of the method of FIG. 7, the filtering may include: determining that the wireless link between the user device and the access point is blocked for one or more measurement samples/values just prior to the Nth measurement instant; and determining a filtered measurement value for the Nth measurement instant when the wireless link is not blocked, the filtered measurement value for the Nth measurement instant being based on at least one of the following: the physical measurement value for the Nth measurement instant and a last or most recent filtered measurement value that was determined when the wireless link was not blocked.

According to an example implementation of the method of FIG. 7, wherein, in determining the filtered measurement value for the Nth measurement instant, the last filtered measurement value is weighted by an updated filter factor such that the last filtered measurement value decreases as the amount of time between the Nth measurement instant and the last measurement instant when the wireless link was not blocked increases.

According to an example implementation of the method of FIG. 7, the method may further include determining whether a duration of the wireless link blockage is greater than a threshold; and, wherein the modifying includes: modifying the first set of first measurement values using a first technique if the duration of the wireless link blockage is greater than the threshold; and otherwise, modifying the first set of measurement values using a second technique.

According to an example implementation of the method of FIG. 7, the method may further include receiving an indication of the threshold from a network device.

According to an example implementation of the method of FIG. 7, the method may further include receiving information from a network device, the information indicating the process to be followed in the first technique and the process to be followed in the second technique.

In an embodiment, there is provided a method performed by a network element, such as the CSM 310, an access point, or some other network element, the method comprising: transmitting a configuration of the duration threshold $T_{block}$ to the UD. The duration threshold $T_{block}$ may then be applied by the UD to determine whether a duration of a wireless link blockage between the UD and an access point is greater than the duration threshold $T_{block}$ and to determine which modification technique the UD uses for the set of measurement values. In an embodiment, the network element may also transmit an indication of the Detect_thr to the UD. In an embodiment, the network element may also receive the measurement report transmitted by the UD in step 740 of FIG. 7. In an embodiment, the network element/device may use the received report to modify the cluster set for the reporting UD. In one embodiment, the network element may also send to the UE information on which modification technique the UD shall apply depending on $T_{block}$. Also rules and procedure to be followed in each modification technique may be indicated to the UD.

An apparatus may include at least one processor and at least one memory including computer instructions, when executed by the at least one processor, cause the apparatus to: measure, by a user device, a wireless link between the user device and an access point to obtain a first set of measurement values; detect that the wireless link is temporarily blocked during the measuring; modify, by the user device based on the wireless link being temporarily blocked, the first set of measurement values to obtain a second set of measurement values; and send, by the user device to a network device, a report indicating the second set of measurement values.

According to an example implementation of the apparatus, the measurement values of the first set of measurement values may include at least one of the following: physical measurement values; and filtered measurement values wherein one or more physical measurement values have been filtered to obtain one or more filtered measurement values; and wherein the measurement values of the second set of measurement values include at least one of the following: physical measurement values; and filtered measurement values.

According to an example implementation of the apparatus, the causing the apparatus to modify includes causing the apparatus to: determine, by the user device, at least one measurement value, of the second set of measurement values, for a measurement period when the wireless link between the user device and the access point is blocked, the determining being based on at least one measurement value of the wireless link when the wireless link is not blocked.

According to an example implementation of the apparatus, the causing the apparatus to determine the at least one measurement value for the measurement period when the wireless link is blocked may include causing the apparatus to: estimate the at least one measurement value when the wireless link is blocked based on interpolation or extrapolation using at least one measurement value when the wireless link is not blocked.

According to an example implementation of the apparatus, the causing the apparatus to modify may include causing the apparatus to: remove, from the first set of measurement values, one or more measurement values that are measured for measurement periods when the wireless link is blocked.

According to an example implementation of the apparatus, the apparatus is further caused to: filter the second set of measurement values to obtain a set of filtered measurement values.

According to an example implementation of the apparatus, the causing the apparatus to filter may include causing the apparatus to: filter the second set of measurement values to obtain a set of filtered measurement values based on one or more measurement values that are available when the wireless link is blocked and one or more measurement values that are interpolated/extrapolated when the wireless link is blocked.

According to an example implementation of the apparatus, the causing the apparatus to filter may include causing the apparatus to: perform filtering on physical measurement values when the wireless link is not blocked; and ceasing the filtering on physical measurement values during any time periods in which the wireless link is blocked.

According to an example implementation of the apparatus, the causing the apparatus to filter may include causing the apparatus to: determine that the wireless link between the user device and the access point is blocked for one or more measurement values just prior to the Nth measurement instant; and determine a filtered measurement value for the Nth measurement instant when the wireless link is not blocked, the filtered measurement value for the Nth measurement instant being based on at least one of the following: the physical measurement value for the Nth measurement instant and a last or most recent filtered measurement value that was determined when the wireless link was not blocked.

According to an example implementation of the apparatus, in causing the apparatus to determine the filtered measurement value for the Nth measurement instant, the last filtered measurement value is weighted by an updated filter factor such that the last filtered measurement value decreases as the amount of time between the Nth measurement instant and the last measurement instant when the wireless link was not blocked increases.

According to an example implementation of the apparatus, further including causing the apparatus to: determine whether a duration of the wireless link blockage is greater than a threshold; and, wherein causing the apparatus to modify comprises causing the apparatus to: modify the first set of first measurement values using a first technique if the duration of the wireless link blockage is greater than the threshold; and otherwise, modify the first set of measurement values using a second technique.

A computer program product includes a computer-readable storage medium and storing executable code that, when executed by at least one data processing apparatus, is configured to cause the at least one data processing apparatus to perform a method including: measuring, by a user device, a wireless link between the user device and an access point to obtain a first set of measurement values; detecting that the wireless link is temporarily blocked during the measuring; modifying, by the user device based on the wireless link being temporarily blocked, the first set of measurement values to obtain a second set of measurement values; and sending, by the user device to a network device, a report indicating the second set of measurement values.

Figure 8:
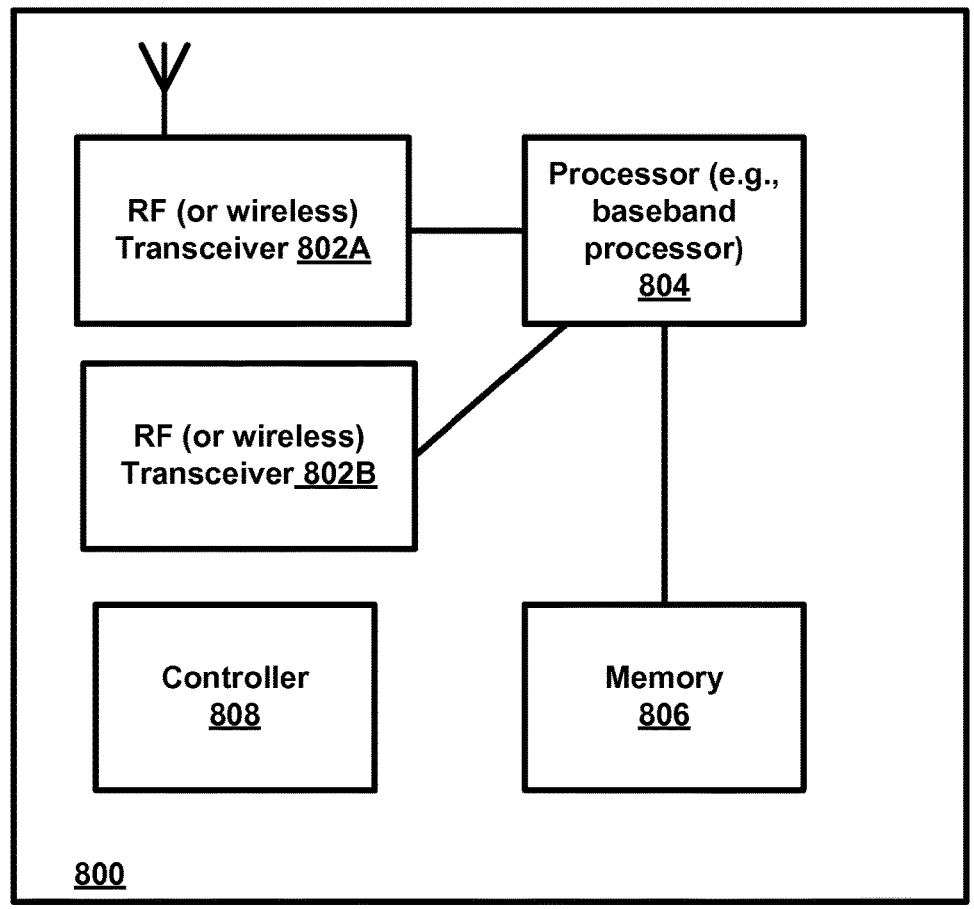
FIG. 8 is a block diagram of a wireless station (e.g., base station or mobile station) according to an example implementation.

FIG. 8 is a block diagram of a wireless station (e.g., a network element/device or user device) 800 according to an example implementation. The wireless station 800 may include, for example, one or two RF (radio frequency) or wireless transceivers 802A, 802B, where each wireless transceiver includes a transmitter to transmit signals and a receiver to receive signals. The wireless station also includes a processor or control unit/entity (controller) 804 to execute instructions or software and control transmission and receptions of signals, and a memory 806 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method, comprising:
   measuring, by a user device, a wireless link between the user device and an access point to obtain a first set of measurement values;
   detecting that the wireless link is temporarily blocked during the measuring;
   modifying, by the user device based on the wireless link being temporarily blocked, the first set of measurement values to obtain a second set of measurement values;
   wherein the modifying includes determining, by the user device, at least one measurement value, of the second set of measurement values, for a measurement period when the wireless link between the user device and the access point is blocked, the determining being based on at least one measurement value of the wireless link when the wireless link is not blocked; and
   sending, by the user device to a network device, a report indicating the second set of measurement values.

2. The method of claim 1 wherein the measurement values of the first set of measurement values comprise at least one of the following:

physical measurement values; and
filtered measurement values wherein one or more physical measurement values have been filtered to obtain one or more filtered measurement values; and
wherein the measurement values of the second set of measurement values comprise at least one of the following:
physical measurement values; and
filtered measurement values.

3. The method of claim 1 wherein the determining the at least one measurement value for the measurement period when the wireless link is blocked comprises:
   estimating the at least one measurement value when the wireless link is blocked based on interpolation or extrapolation using at least one measurement value when the wireless link is not blocked.

4. The method of claim 1, wherein the modifying comprises:
   removing, from the first set of measurement values, one or more measurement values that are measured for measurement periods when the wireless link is blocked.

5. The method of claim 1, and further comprising:
   filtering the second set of measurement values to obtain a set of filtered measurement values.

6. The method of claim 5, wherein filtering is based on a plurality of measurement values that are available or interpolated when the wireless link is not blocked and blocked, respectively.

7. The method of claim 5, wherein the filtering comprises:
   performing filtering on physical measurement values when the wireless link is not blocked; and
   ceasing the filtering on physical measurement values during any time periods in which the wireless link is blocked.

8. The method of claim 5, wherein the filtering comprises:
   determining that the wireless link between the user device and the access point is blocked for one or more measurement values just prior to the Nth measurement instant; and
   determining a filtered measurement value for the Nth measurement instant when the wireless link is not blocked, the filtered measurement value for the Nth measurement instant being based on at least one of the following: the physical measurement value for the Nth measurement instant and a last or most recent filtered measurement value that was determined when the wireless link was not blocked.

9. The method of claim 8, wherein, in determining the filtered measurement value for the Nth measurement instant, the last filtered measurement value is weighted by an updated filter factor such that the last filtered measurement value decreases as the amount of time between the Nth measurement instant and the last measurement instant when the wireless link was not blocked increases.

10. The method of claim 1, further comprising:
    determining whether a duration of the wireless link blockage is greater than a threshold;
    and, wherein the modifying comprises:
    modifying the first set of first measurement values using a first technique if the duration of the wireless link blockage is greater than the threshold; and
    otherwise, modifying the first set of measurement values using a second technique.

11. The method of claim 10 and further comprising:
    receiving an indication of the threshold from a network device.

12. The method of claim 10 and further comprising:
receiving information from a network device, the information indicating the process to be followed in the first technique and the process to be followed in the second technique.

13. An apparatus comprises at least one processor and at least one memory including computer instructions, when executed by the at least one processor, cause the apparatus to:
measure a wireless link between the apparatus and an access point to obtain a first set of measurement values;
detect that the wireless link is temporarily blocked during the measuring;
modify, based on the wireless link being temporarily blocked, the first set of measurement values to obtain a second set of measurement values;
wherein causing the apparatus to modify includes causing the apparatus to determine at least one measurement value, of the second set of measurement values, for a measurement period when the wireless link between the apparatus and the access point is blocked, the determining being based on at least one measurement value of the wireless link when the wireless link is not blocked; and
send, to a network device, a report indicating the second set of measurement values.

14. The apparatus of claim 13 wherein the measurement values of the first set of measurement values comprise at least one of the following:
physical measurement values; and
filtered measurement values wherein one or more physical measurement values have been filtered to obtain one or more filtered measurement values; and
wherein the measurement values of the second set of measurement values comprise at least one of the following:
physical measurement values; and
filtered measurement values.

15. The apparatus of claim 13 wherein causing the apparatus to determine the at least one measurement value for the measurement period when the wireless link is blocked comprises causing the apparatus to:
estimate the at least one measurement value when the wireless link is blocked based on interpolation or extrapolation using at least one measurement value when the wireless link is not blocked.

16. The apparatus of claim 13, wherein causing the apparatus to modify comprises causing the apparatus to:
remove, from the first set of measurement values, one or more measurement values that are measured for measurement periods when the wireless link is blocked.

17. The apparatus of claim 13, wherein the apparatus is further caused to:
filter the second set of measurement values to obtain a set of filtered measurement values.

18. The apparatus of claim 17, wherein causing the apparatus to filter comprises causing the apparatus to:
filter the second set of measurement values to obtain a set of filtered measurement values based on one or more measurement values that are available when the wireless link is not blocked and one or more measurement values that are interpolated/extrapolated when the wireless link is blocked.

19. The apparatus of claim 17, wherein causing the apparatus to filter comprises causing the apparatus to:
perform filtering on physical measurement values when the wireless link is not blocked; and
ceasing the filtering on physical measurement values during any time periods in which the wireless link is blocked.

20. The apparatus of claim 17, wherein causing the apparatus to filter comprises causing the apparatus to:
determine that the wireless link between the apparatus and the access point is blocked for one or more measurement values just prior to the Nth measurement instant; and
determine a filtered measurement value for the Nth measurement instant when the wireless link is not blocked, the filtered measurement value for the Nth measurement instant being based on at least one of the following: the physical measurement value for the Nth measurement instant and a last or most recent filtered measurement value that was determined when the wireless link was not blocked.

21. The apparatus of claim 20, wherein, in causing the apparatus to determine the filtered measurement value for the Nth measurement instant, the last filtered measurement value is weighted by an updated filter factor such that the last filtered measurement value decreases as the amount of time between the Nth measurement instant and the last measurement instant when the wireless link was not blocked increases.

22. The apparatus of claim 13, further comprising causing the apparatus to:
determine whether a duration of the wireless link blockage is greater than a threshold;
and, wherein causing the apparatus to modify comprises causing the apparatus to:
modify the first set of first measurement values using a first technique if the duration of the wireless link blockage is greater than the threshold; and
otherwise, modify the first set of measurement values using a second technique.

23. A computer program product, the computer program product comprising a non-transitory computer-readable storage medium and storing executable code that, when executed by at least one data processing apparatus, is configured to cause the at least one data processing apparatus to perform a method comprising:
measuring a wireless link between the apparatus and an access point to obtain a first set of measurement values;
detecting that the wireless link is temporarily blocked during the measuring;
modifying, based on the wireless link being temporarily blocked, the first set of measurement values to obtain a second set of measurement values; and
wherein the modifying includes determining at least one measurement value, of the second set of measurement values, for a measurement period when the wireless link between the apparatus and the access point is blocked, the determining being based on at least one measurement value of the wireless link when the wireless link is not blocked; and
sending, to a network device, a report indicating the second set of measurement values.

* * * * *

UNITED STATES PATENT AND TRADEMARK OFFICE
CERTIFICATE OF CORRECTION

PATENT NO. : 9,713,023 B2  Page 1 of 1
APPLICATION NO. : 14/883185
DATED : July 18, 2017
INVENTOR(S) : Awada et al.

It is certified that error appears in the above-identified patent and that said Letters Patent is hereby corrected as shown below:

In the Claims

In Column 22, Line 53, Claim 23, delete "values; and" and insert -- values; --, therefor.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*